(12) United States Patent
Tsukamoto

(10) Patent No.: US 7,646,889 B2
(45) Date of Patent: Jan. 12, 2010

(54) RAIN SENSOR

(75) Inventor: Takeshi Tsukamoto, Okazaki (JP)

(73) Assignee: DENSO CORPORATION, Kariya (JP)

( * ) Notice: Subject to any disclaimer, the term of this patent is extended or adjusted under 35 U.S.C. 154(b) by 688 days.

(21) Appl. No.: 11/376,210

(22) Filed: Mar. 16, 2006

(65) Prior Publication Data

US 2006/0228001 A1 Oct. 12, 2006

(30) Foreign Application Priority Data

Apr. 11, 2005 (JP) ............................. 2005-113497

(51) Int. Cl.
*G06K 9/00* (2006.01)
(52) U.S. Cl. ...................................... 382/104; 382/103
(58) Field of Classification Search ................. 340/438; 382/104, 100, 103; 250/208.1
See application file for complete search history.

(56) References Cited

U.S. PATENT DOCUMENTS

| | | | |
|---|---|---|---|
| 6,313,454 B1 * | 11/2001 | Bos et al. .................. | 250/208.1 |
| 6,681,163 B2 | 1/2004 | Stam et al. | |
| 6,853,897 B2 | 2/2005 | Stam et al. | |
| 7,019,275 B2 | 3/2006 | Stam et al. | |
| 7,259,367 B2 | 8/2007 | Reime | |
| 2003/0069674 A1 | 4/2003 | Stam et al. | |
| 2004/0144911 A1 | 7/2004 | Stam et al. | |
| 2004/0153225 A1 | 8/2004 | Stam et al. | |
| 2005/0206511 A1 * | 9/2005 | Heenan et al. .............. | 340/438 |
| 2006/0163458 A1 | 7/2006 | Reime | |
| 2006/0177098 A1 | 8/2006 | Stam | |

FOREIGN PATENT DOCUMENTS

| | | |
|---|---|---|
| JP | A-09-126998 | 5/1997 |
| JP | A-H9-126998 | 5/1997 |
| JP | A-H09-126998 | 5/1997 |
| JP | A-H10-111249 | 4/1998 |
| JP | A-H10-143643 | 5/1998 |
| JP | A-H10-148618 | 6/1998 |
| JP | A-H10-261064 | 9/1998 |
| JP | A-2001-147278 | 5/2001 |

OTHER PUBLICATIONS

Preliminary Search Report dated Nov. 25, 2008 in corresponding French patent application No. 0603163 (and English translation).
Second Office Communication (English translation) from Korean Patent Office containing a Preliminary Rejection dated Apr. 10, 2007 in the corresponding Korean Application 10-2006-0032515.

* cited by examiner

*Primary Examiner*—Brian P Werner
*Assistant Examiner*—Claire Wang
(74) *Attorney, Agent, or Firm*—Posz Law Group, PLC

(57) ABSTRACT

A rain sensor provided in a vehicle includes a camera and a processor. The camera takes an image of a scene outside of the vehicle through a windshield of the vehicle with an infinite focal length. The processor detects rain based on a variation degree of intensities of pixels in the image from an average intensity of the pixels.

12 Claims, 6 Drawing Sheets

FIG. 8A
FIG. 8B
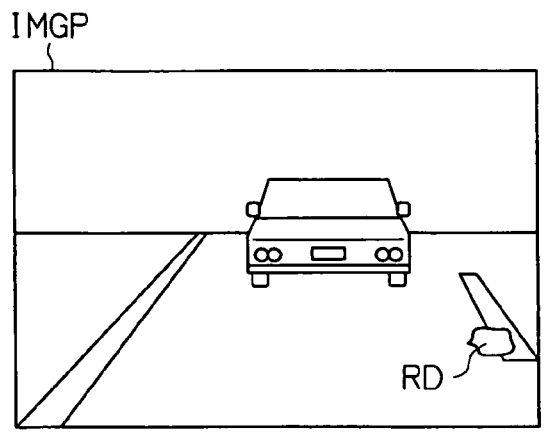
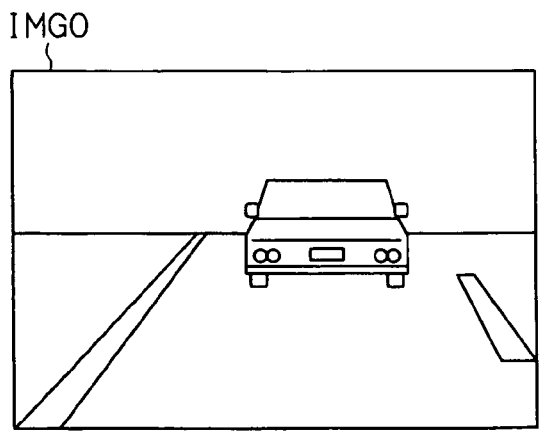
FIG. 9
PRIOR ART
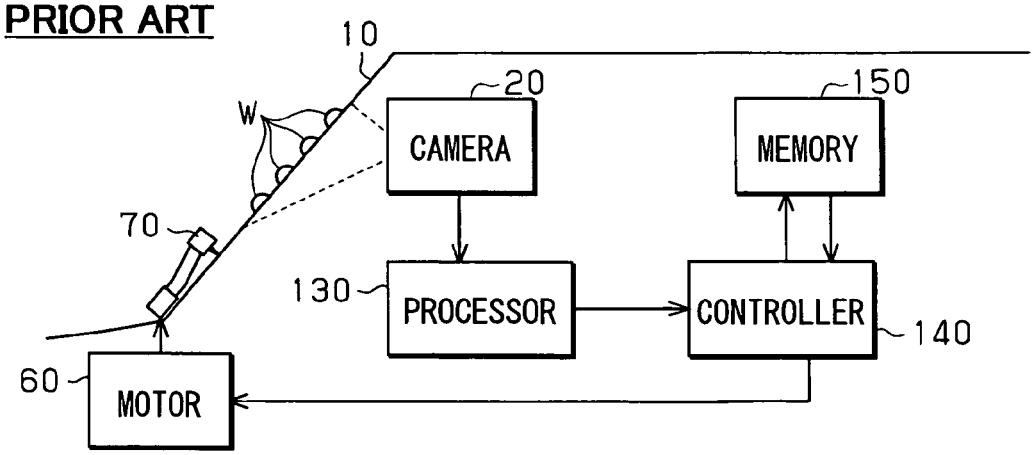
FIG. 10A
PRIOR ART
FIG. 10B
PRIOR ART
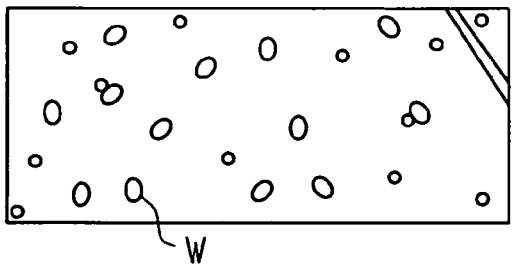
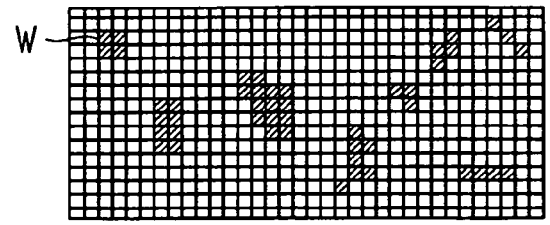

RAIN SENSOR

CROSS REFERENCE TO RELATED APPLICATION

This application is based on and incorporates herein by reference Japanese patent application No. 2005-113497 filed on Apr. 11, 2005.

FIELD OF THE INVENTION

The present invention relates to a rain sensor for detecting rain.

BACKGROUND OF THE INVENTION

In JP 2001-147278A, a rain sensor provided in a vehicle is disclosed which detects rain drops by including a camera 20, an image processor 130, a controller 140, and a memory 150 (shown in FIG. 9).

The camera 20 takes an image of a predetermined area in a windshield 10 of the vehicle. The image processor 130 obtains a binarized image by processing the image taken by the camera 20. The controller 140 stores the binarized image into the memory 150. Every time the image processor 130 obtains a binarized image of the predetermined area, the controller 140 determines an amount of rain W on the windshield 10 based on the currently binarized image and a previously binarized image stored in the memory 150. The controller 140 controls a wiper 70 through a motor 60 based on the determined amount.

An operation of the conventional rain sensor is described in detail below. An original image taken by the camera 20 is inputted into the image processor 130. FIG. 10A shows an example of the original image. The image processor 130 then executes noise reduction, edge extraction, and binarization of the original image to obtain a binarized image. The binarized image is inputted into the controller 140. FIG. 10B shows an example of the binarized image.

The controller 140 makes a determination whether external substances are on the windshield 10 based on the binarized image. If the determination is affirmative, the controller 140 reads a previously stored binarized image in the memory 150. The controller then makes a determination whether the external substances are rain drops by comparing the currently obtained binarized image with the previously stored binarized image. If the determination is affirmative, the controller 140 detects an amount of the rain drops. If the detected amount is larger than a predetermined threshold, the controller 140 continuously operates the wiper 70 using the motor 60. If the detected amount is smaller than the predetermined threshold, the controller 140 intermittently operates the wiper 70. The rain sensor thus reduces troublesomeness on a driver of the vehicle because the driver need not judge an amount of rain to operate the wiper 70.

The rain sensor described above detects the external substances on the windshield 10 by executing edge extraction of the original image. In heavy rain where the amount of the rain drops is huge, borders between the rain drops quickly disappear and, thereby, the entire windshield 10 is covered with the rain. In this case, it is difficult for the controller 140 to extract edges of the rain drops. In another case that a mud splash causes a large amount of mud to be attached to the windshield 10, it is also difficult for the controller 140 to extract edges of the mud. In this context, the conventional rain sensor has room for improvement.

SUMMARY OF THE INVENTION

It is therefore an object of the present invention to provide a rain sensor for detecting rain with a higher accuracy.

To achieve the above object, a rain sensor for a vehicle is provided with the following: a camera is included for taking an image of a scene outside of the vehicle through a windshield of the vehicle with an infinite focal length; and a processor unit is included for detecting rain based on a variation degree of intensities of pixels, which are included in the image, from an average intensity of the pixels.

The rain sensor can therefore detect whether rainfall or the like occurs or not with a higher accuracy, even in heavy rain or massive mud splash.

BRIEF DESCRIPTION OF THE DRAWINGS

The invention, together with additional objective, features and advantages thereof, will be best understood from the following description, the appended claims and the accompanying drawings. In the drawings:

FIG. 8A is an image taken at a current time by the camera without sub-areas defined;

FIG. 8B is an image taken at a previous time by the camera without sub-areas defined;

FIG. 9 is a view and diagram showing a schematic overall structure of a rain sensor of prior art;

FIG. 10A is an example of an original image taken by a camera of the rain sensor of prior art; and FIG. 10B is an example of a binarized image of prior art.

DETAILED DESCRIPTION OF THE PREFERRED EMBODIMENTS

Hereinafter, a rain sensor according to an embodiment of the present invention will be described with reference to FIGS. 1A to 4. The rain sensor has a structure similar to the conventional rain sensor of prior art shown in FIG. 9. However, there are differences between the rain sensor of the present invention and that of prior art in several aspects such as a camera having an infinite focal length that will be explained below.

Figure 1A:
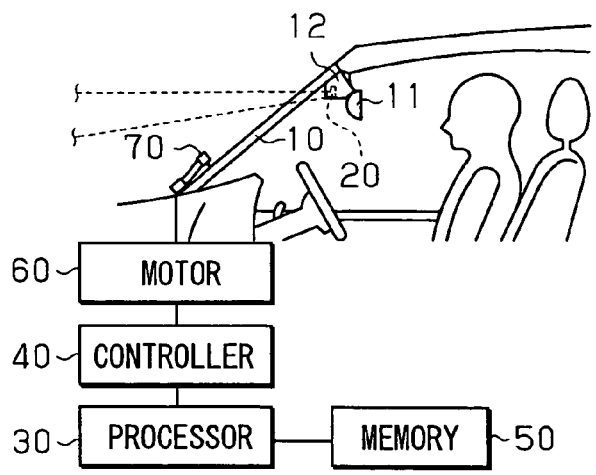
FIG. 1A shows a view and block diagram showing a schematic overall structure of a rain sensor according to an embodiment of the present invention.
Figure 1B:
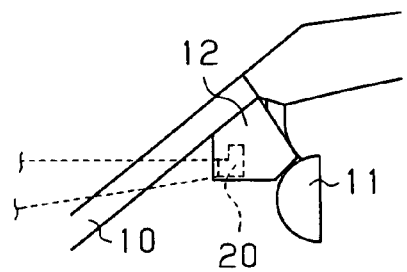
FIG. 1B is an enlarged view of a camera of the rain sensor and peripheral devices.
Figure 2:
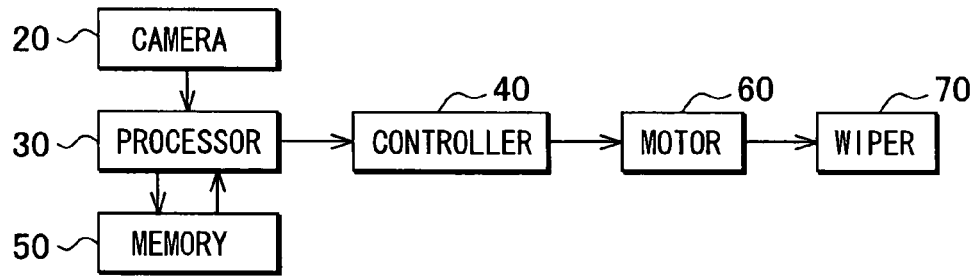
FIG. 2 is a block diagram of the rain sensor and peripheral devices.

As shown in FIGS. 1A, 1B, and 2, a rain sensor of this embodiment used for a vehicle includes a casing 12, a camera 20, an image processor 30 as a processor unit, a controller 40, and a memory 50. The casing 12 is placed between a windshield 10 and a rearview mirror 11, and attached to a surface of the windshield 10 facing a passenger's compartment. The camera 20 is installed in the casing 12 and takes an image of an exterior of the vehicle (or a scene outside of the vehicle) with an infinite focal length through the windshield 10.

The image processor 30 divides an image taken by the camera 20 into several (nine) sub-images which correspond to nine sub-areas that are defined by dividing an area of the image taken by the camera 20. The image processor 30 further calculates a variance for information of each of the sub-images. For each of the sub-areas, the image processor 30 calculates a moment-to-moment transition (difference) that is a difference between two variances which are calculated for the information of each of the sub-images taken at a current time and a previous time. The image processor 30 then processes in a predetermined manner the moment-to-moment differences to calculate the total sum of the processed moment-to-moment differences over all of the sub-areas, which will be explained later in more detail.

The controller 40 receives the total sum from the image processor 30 and then makes a determination whether rain is falling. The controller 40 further controls a wiper 70 on the windshield 10 using a motor 60 by outputting a wiper control signal to the motor 60 depending on the determination.

The memory 50 temporarily stores the sub-images into which the original image taken by the camera 20 is divided.

In this embodiment, a CCD (Charge Coupled Device) camera having a lens and a CCD serves as an example of the camera 20. Since the focal length of the camera 20 is infinite, a scene or sight in the outside of the vehicle is focused by the camera 20 rather than substances (e.g., rain drops) on the windshield 10.

The rain drops attached to the windshield 10 generally function as lenses, which causes reflection and refraction of light. An image taken by the camera 20 therefore includes a blur at a region corresponding to the rain drops. A blur in an image increases a variation (deviation or variance) among intensities of pixels in the region where the blur resides. Therefore a variance of intensities of the pixels in the image including a blur is larger than that in an image including no blur. In addition, the variance increases as the rain drops increase on the windshield 10. For example, the variance increases as a positive value from the previous time to the current time in the following case: no rain drop was present on the windshield 10 when the camera 20 took an image at the previous time and then rain drops are newly present on the windshield 10 when the camera 20 takes an image at the current time (this time).

Figure 3A:
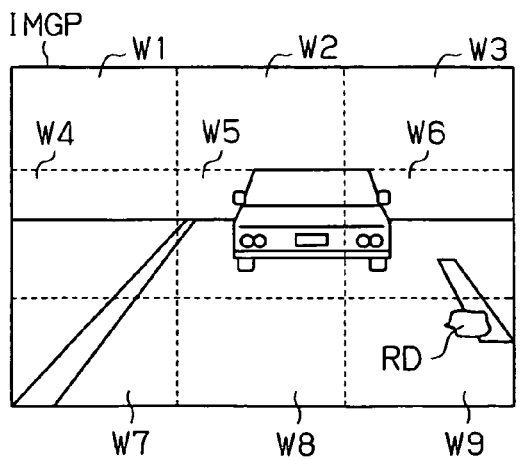
FIG. 3A is an image taken at a current time by the camera with sub-areas defined.
Figure 3B:
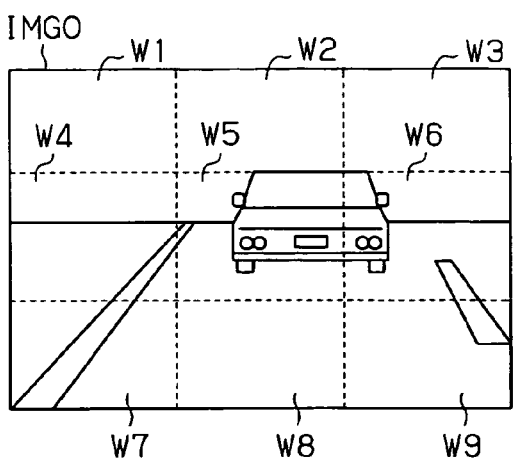
FIG. 3B is an image taken at a previous time by the camera with sub-areas defined.

To detect a moment-to-moment transition (transition over time) of the variance, the image processor 30 divides, as shown in FIGS. 3A and 3B, each of the images (IMGP and IMGO) taken by the camera 20 into nine sub-images W1 to W9 which correspond to nine sub-areas of an entire area included in the images. To calculate a moment-to-moment transition (i.e., from the previous time to the current time) of the variance with respect to each sub-area, the image processor 30 mainly executes processes (A) to (C) described below:

(A) The image processor 30 obtains a moment-to-moment transition with respect to each of the sub-areas by calculating a difference (as moment-to-moment transition) between a current variance and a previous variance with respect to each of the sub-areas. The current variance is a variance with respect to each sub-image of an image that is most recently obtained from the camera 20. The previous variance is a variance with respect to each sub-image in another image, which is previously obtained from the camera 20 and stored in the memory 50.

(B) The image processor 30 selects differences which are larger than a threshold from the differences with respect to all the sub-areas calculated at the process (A), and subjects the selected differences to a subsequent process.

(C) The image processor 30 calculates a sum of results obtained in the process (B) with respect to the selected differences.

More specifically in the process (A), the image processor 30 first calculates with respect to each of the sub-areas an average intensity $A_i$ ($i=1, 2, \ldots, 9$) of pixels in each corresponding sub-image $W_i$ ($i=1, 2, \ldots, 9$) by using an equation (1).

$$A_i = \{\Sigma\Sigma I(x,y)\}/N_i \qquad (1)$$

Here, $I(x, y)$ is an intensity of each pixel, and $N_i$ is the number of the pixels which the sub-image $W_i$ has.

The image processor 30 then calculates a variance $VP_i$ ($i=1, 2, \ldots, 9$) using an equation (2).

$$VP_i = [\Sigma\{I(x,y)-A_i\}^2]/N_i \qquad (2)$$

Here, when the calculated variances $VP_i$ are temporarily stored in the memory 50, the stored calculated variances are to be used as previous variances $VO_i$ ($i=1, 2, \ldots, 9$) at the next time.

The image processor 30 then calculates differences $D_i$ ($i=1, 2, \ldots, 9$) between the variances $VP_i$ calculated at the current time and the corresponding previous variances $VO_i$ read from the memory 50, respectively, by using an equation (3).

$$D_i = VP_i - VO_i \qquad (3)$$

In an example shown in FIGS. 3A and 3B, the sub-image W9 at the current time has a blur RD corresponding to a rain drop, as shown in FIG. 3A, while the sub-image W9 at the previous time has no blur, as shown in FIG. 3B. In this case, the differences D1 to D8 are zero because there is no differences between variances VP1 to VP8 and corresponding previous variances VO1 to VO8, respectively. In contrast, the difference D9 for the sub-image W9 has a positive value because there is a significant difference between the variance VP9 and the previous variance VO9. The rain thus can be detected by calculating the difference $D_i$.

In the process (B), the image processor 30 selects differences $D_i$ larger than a constant threshold Dth from the differences D1 to D9. More specifically, the image processor 30 makes a determination for each of the differences D1 to D9 calculated in the process (A) whether the difference $D_i$ is larger than the threshold Dth. When the determination is affirmative, the image processor 30 then sets a flag $FW_i$ ($i=1, 2, \ldots, 9$) corresponding to the difference $D_i$ to "1" (ON). In other words, the image processor 30 sets the flags FW1 to FW9 to "1" (ON) or "0" (OFF) depending on whether the respective differences D1 to D9 are larger than the threshold Dth or not.

Then in the process (C), the image processor 30 calculates a total sum S of the flags FW1 to FW9 set in the process (B), by using an equation (3).

$$S = \Sigma FW_i \qquad (3)$$

Thus, the total sum S is the number of sub-images $W_i$ which have differences $D_i$ larger than the threshold Dth.

In the example shown in FIGS. 3A and 3B, the total sum S is equal to one because only the difference D9 is larger than the threshold Dth.

The controller 40 makes a determination whether the calculated total sum S is larger than a constant threshold Nth. When the determination is affirmative, the controller 40 determines that rainfall (or rain) or mud splash is present. When the determination is negative, the controller 40 determines that there is neither rainfall nor mud splash. In the case that the controller 40 determines that the rainfall or mud splash is present, the controller 40 operates the wiper 70 using the motor 60 to clean the windshield 10.

Figure 4:
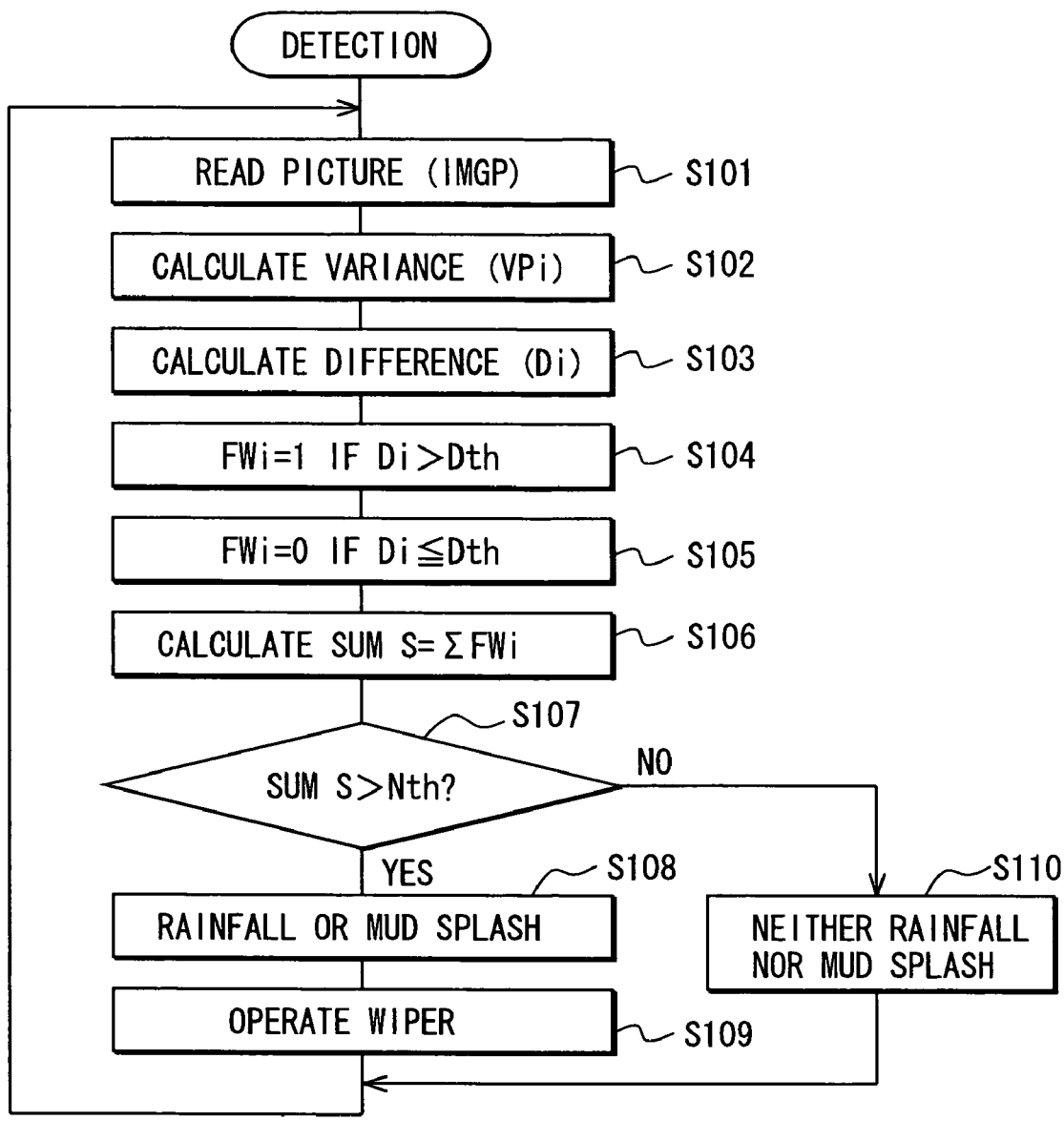
FIG. 4 is a flowchart showing a process for detecting rain.

The operation of the rain sensor will be described in further detail with reference to the flowchart in FIG. 4.

In a situation that a mode is selected by a wiper switch (not shown in figures), the mode in which the wiper 70 is set to be controlled by the rain sensor, the image processor 30 reads at Step S101 an image IMGP taken by the camera 20. The image IMGP is divided into the sub-images Wi by the image processor 30.

The variances VPi are calculated at Step S102 through the equation (2) for the respective sub-images Wi obtained at Step S101. The calculated variances VPi are temporarily stored in the memory 50.

The image processor 30 reads at Step S103 the previous variances VOi corresponding to an image IMGO temporarily stored in the memory 50. At Step S103, the image processor 30 further calculates by using the equation (3) the differences Di between the current variances VPi corresponding to the image IMGP and the previous variances VOi corresponding to the image IMGO, respectively.

At Steps S104 and S105, the image processor 30 determines whether each of the calculated differences Di is larger than the threshold Dth. When a first difference Di is larger than the threshold Dth, a flag FWi which corresponds to the first difference Di is set to one (FWi=1). When a second difference Di is not larger than the threshold Dth, a flag FWi which corresponds to the second difference Di is set to zero (FWi=0). Subsequently at Step S106, the number of sub-images Wi having the flag of FWi=1 is calculated as the total sum S through the equation (4).

At Step S107, the controller 40 determines whether the total sum S is larger than the threshold Nth. When the total sum S is larger than the threshold Nth, the controller 40 determines at Step S108 that rainfall or mud splash is present, and accordingly causes the wiper 70 to clean the windshield 10 through the motor 60 at Step S109. When the total sum S is not larger than the threshold Nth, the controller 40 determines at Step S110 that there is neither rainfall nor mud splash.

The rain sensor of this embodiment has effects shown below.

(1) The rain sensor has the camera 20 with the infinite focal length. In addition, the rain sensor detects rain (or rainfall) based on a variance Vi, which indicates a degree of a variation (or variation degree) among intensities of pixels, which are included in an image taken by the camera 20, from an average intensity of the pixels.

The rain sensor is therefore capable of detecting rain or the like through simple calculations of the variance Vi, even in heavy rain or mud splash which makes it difficult to detect (or extract) edges of rain drops on the windshield 10. In addition, the camera 20, which has the infinite focal length, can also serve as a camera for another system detecting a tunnel, an obstacle, a white line on a road, and so on.

(2) In addition, the variance is calculated for each of the nine sub-images into which the image taken by the camera 20 is divided. The rain sensor is therefore capable of detecting rain or the like while minimizing influences from a small and momentary disturbance such as a sunlight reflected by a building or a bird crossing in front of the vehicle.

(3) In addition, to obtain a moment-to-moment transition of the variances Vi, the rain sensor calculates for each of the sub-images Wi the difference Di between the variance VPi at the current time and the variance VOi at the previous time.

The rain sensor is therefore capable of detecting rain through the simple difference calculations.

(4) In addition, the rain sensor detects rain based on the number or sum S of the sub-images having the differences Di larger than the threshold Dth. The rain sensor is thus capable of detecting rain with simple calculations while minimizing influences from external disturbances.

The present invention should not be limited to the embodiment discussed above and shown in the figures, but may be implemented in various ways without departing from a scope of the invention.

For example, a CMOS (Complementary Metal Oxide Semiconductor) camera may serve as a camera 20.

Figure 5:
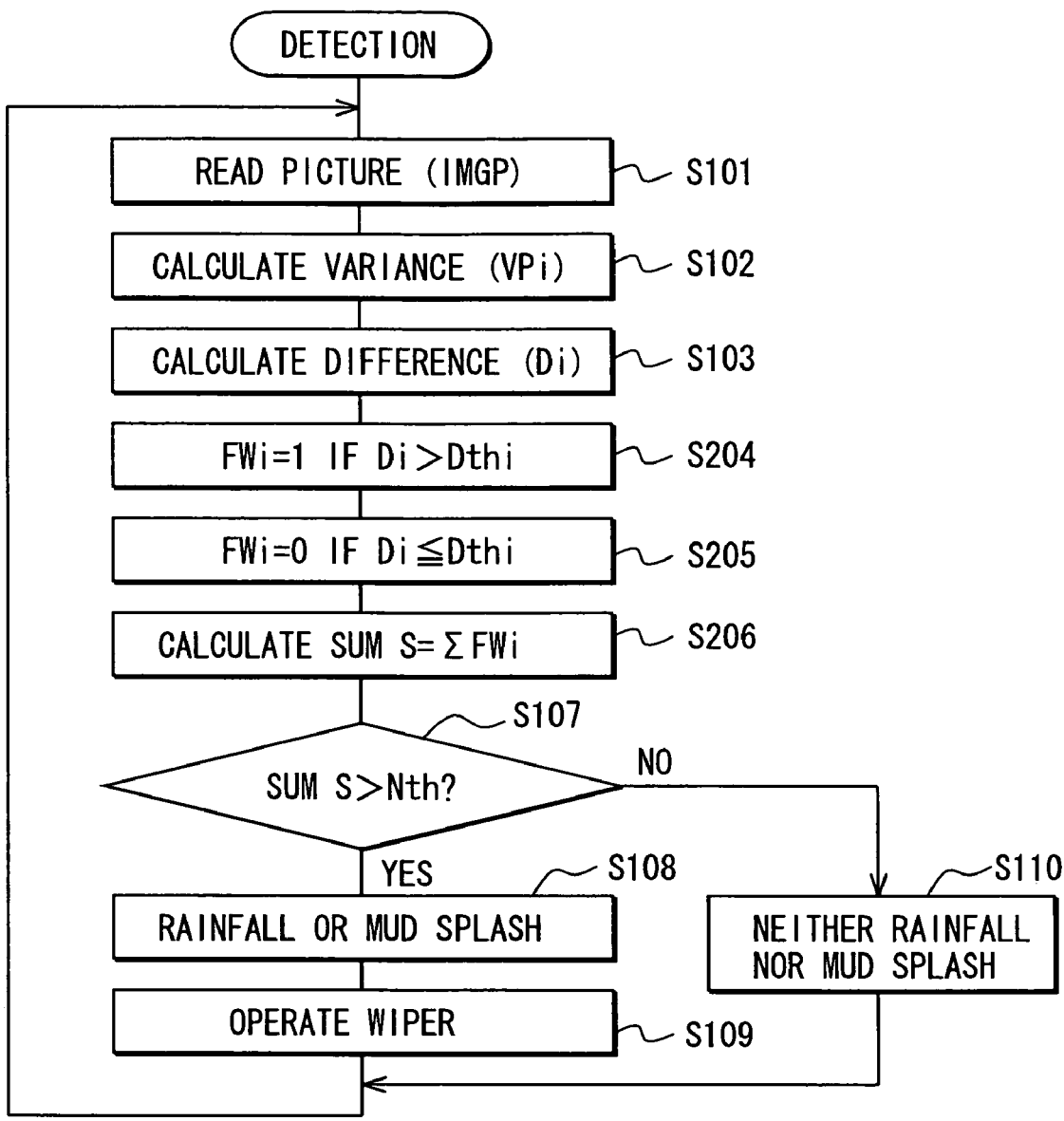
FIG. 5 is a flowchart showing another process for detecting rain.

As shown in Steps S204 to S206 in FIG. 5, the rain sensor may calculate another total sum S which is the number of the sub-images Wi each of which has a difference Di larger than a threshold Dthi (i=1, 2, . . . ) that is uniquely defined to each sub-image Wi. Namely, the values of the thresholds Dth1 to Dth9 are defined for the nine sub-areas, respectively, to be different from each other.

The rain sensor with the modification is capable of detecting rain with a higher accuracy through simple supplemental calculations, for example by decreasing a threshold Dthi for a specific sub-area which is significant for keeping the driver's vision, or by increasing another threshold Dthi for another specific sub-area which tends to suffer from external disturbance. In FIG. 5, the steps other than Steps S204 to S206 are the same as the corresponding steps in FIG. 4.

Generally, an image near its center portion of the windshield taken by the camera tends to have a small moment-to-moment transition of intensities of pixels in the image; however, the center portion is important or significant for securing the driver's vision. In contrast, an image at its lateral end portions of the windshield taken by the camera tends to have a large moment-to-moment transition of intensities, which is caused by movements of the vehicle; however, even if rain drops or the like are attached to the lateral end portions (or bottom end portions of the windshield), the driver's vision is not significantly obstructed.

Figure 6:
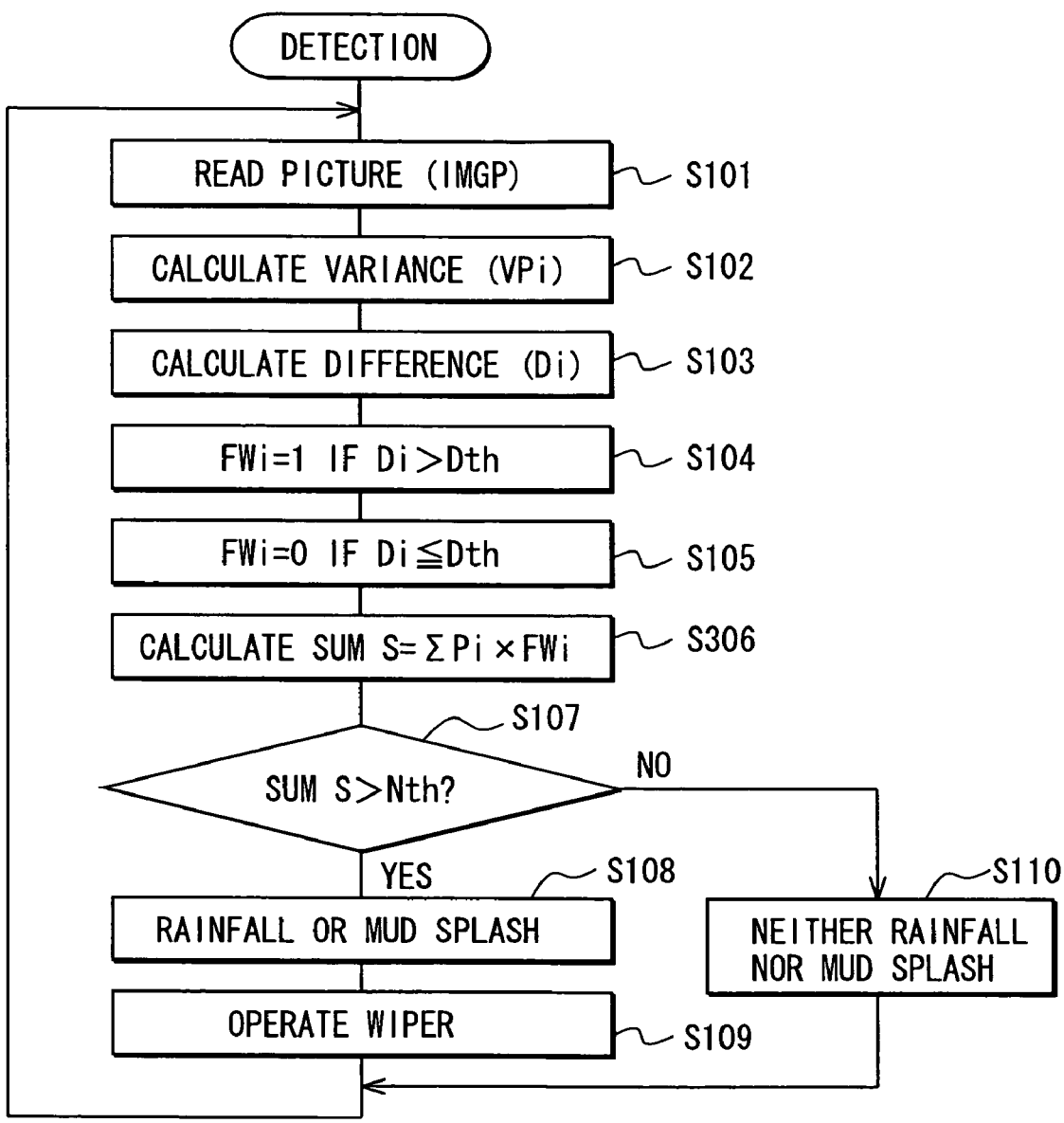
FIG. 6 is a flowchart showing another process for detecting rain.

According to the above context, the rain sensor may, as shown in Step S306 in FIG. 6, calculate a weighted sum S which is a sum of the flags FWi weighted (multiplied) by respective values Pi (i=1, 2, . . . ). The values P1, P2, . . . are weights which correspond to sub-areas, respectively, and may be different from each other.

The rain sensor with the modification is capable of detecting rain with a higher accuracy through simple supplemental calculations, for example by giving a larger value to a weight Pi for a sub-area which is significant for securing the driver's vision, or by giving a smaller value to a weight Pi for a sub-area which tends to suffer from external disturbance. In FIG. 6, the steps other than Step S306 are the same as the corresponding steps in FIG. 4.

Figure 7:
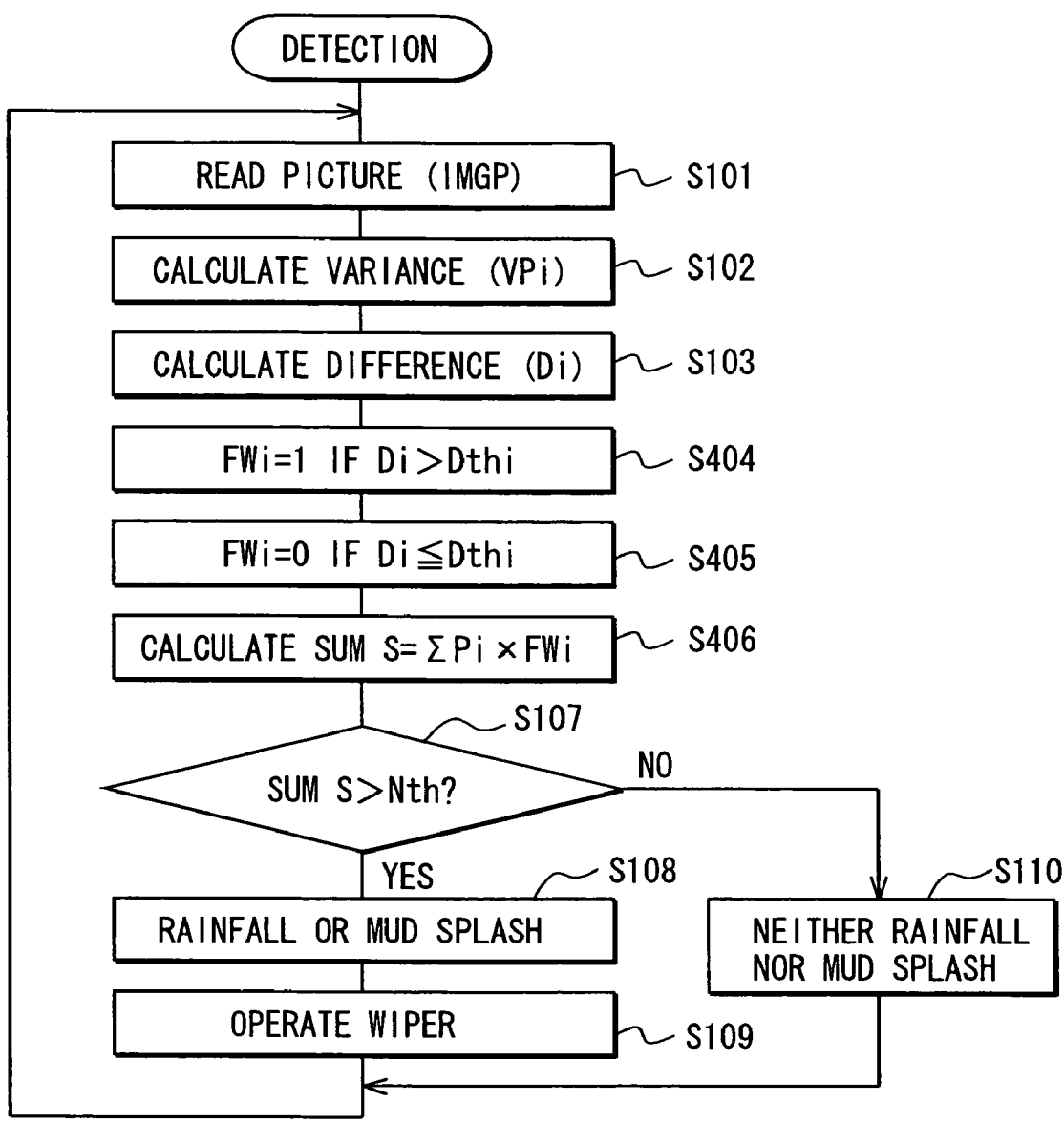
FIG. 7 is a flowchart showing another process for detecting rain.

Furthermore, as shown in Steps S404 to S406 in FIG. 7, the rain sensor may calculate a weighted sum S of the sub-images Wi each of which has a difference Di larger than a threshold Dthi (i=1, 2, . . . ) specific or unique to each sub-area or each sub-image Wi. Specifically, the weighted sum S is a total sum of the flags FWi weighted by respective values Pi (i=1, 2, . . . ). The values P1, P2, . . . are weights which correspond to sub-areas, respectively, and may be different from each other.

The rain sensor with the modification is also capable of detecting rain with a higher accuracy through simple supplemental calculations. In FIG. 7, the steps other than Steps S404 to S406 are the same as the corresponding steps in FIG. 4.

The rain sensor is not limited to ones dividing an image into sub-images. As shown in FIGS. 8A and 8B, the rain sensor may detect rain by calculating a moment-to-moment transition of a variance of an entire image taken by a camera. In this case, the rain sensor still has the effect (1) described above.

The rain sensor may use a change ratio of the current variance VPi from the corresponding previous variance VOi in place of the difference Di between the current variance VPi and the corresponding previous variance VOi. The difference may be replaced with any other values representing a moment-to-moment transition of the variance.

The rain sensor may use an equation (5) below in place of the equation (2).

$$Vi = [\Sigma |I(x,y) - Ai|]/Ni \quad (5)$$

Namely, the rain sensor may replace the calculation of variances of the sub-images with any other calculations such as calculations of standard deviations of the sub-images, if the calculated values represent a variation degree of the intensities of pixels in the sub-images from an average intensity of the pixels.

It will be obvious to those skilled in the art that various changes may be made in the above-described embodiments of the present invention. However, the scope of the present invention should be determined by the following claims.

What is claimed is:

1. A rain sensor for a vehicle, comprising:
   a camera provided in the vehicle configured with a long focal length set to take an image of a scene outside of the vehicle through a windshield of the vehicle while blurring a substance on the windshield; and
   a processor unit configured to detect rain based on a variation degree of intensities of pixels, which are included in the image, from an average intensity of the pixels, wherein
   the processor unit is configured to
      divide an image taken by the camera into sub-images according to a plurality of sub-areas defined in an area of the image;
      calculate, with respect to each of the plurality of sub-areas, a moment-to-moment transition of a variation degree of intensities of pixels, which are included in the each of the plurality of sub-areas, from an average intensity of the pixels included in the each of the plurality of sub-areas, and
      detect rain based on the moment-to-moment transition.

2. The rain sensor according to claim 1, further comprising:
   a memory for temporarily storing, with respect to each of the plurality of sub-areas, a first variation degree of intensities of pixels included in the each of the plurality of sub-areas of an image taken by the camera at a first time previous to a second time, wherein
   the processor unit calculates, with respect to the each of the plurality of sub-areas, a moment-to-moment transition by computing a difference between (i) the first variation degree stored in the memory and (ii) a second variation degree of intensities of pixels included in the each of the plurality of sub-areas of an image taken by the camera at the second time.

3. The rain sensor according to claim 2, wherein
   the processor unit
      applies a given process to a difference, which is computed between the first variation degree and the second variation degree with respect to the each of the plurality of sub-areas, to assign the difference a given value, and
      detects rain based on a result of incorporating given values obtained from the given process with respect to all the plurality of sub-areas.

4. The rain sensor according to claim 3, wherein
   in the given process,
   when a difference between the first variation degree and the second variation degree is not larger than a threshold value, the difference is assigned zero as a given value, and
   the result of incorporating given values is obtained as a sum of given values with respect to all the plurality of sub-areas.

5. The rain sensor according to claim 3, wherein
   in the given process,
   when a first difference between the first variation degree and the second variation degree is larger than a threshold value, the first difference is assigned one as a given value,
   when a second difference between the first variation degree and the second variation degree is not larger than the threshold value, the second difference is assigned zero as a given value, and
   the result of incorporating given values is obtained as a sum of given values with respect to all the plurality of sub-areas.

6. The rain sensor according to claim 3, wherein
   in the given process,
   when a difference between the first variation degree and the second variation degree is not larger than a threshold value that is unique to the each of the plurality of sub-areas, the difference is assigned zero as a given value, and
   the result of incorporating given values is obtained as a sum of given values with respect to all the plurality of sub-areas.

7. The rain sensor according to claim 3, wherein
   in the given process,
   when a first difference between the first variation degree and the second variation degree with respect to the each of the plurality of sub-areas is larger than a threshold value that is unique to the each of the plurality of sub-areas, the first difference is assigned one as a given value,
   when a second difference between the first variation degree and the second variation degree with respect to the each of the plurality of sub-areas is not larger than a threshold value that is unique to the each of the plurality of sub-areas, the second difference is assigned zero as a given value, and
   the result of incorporating given values is obtained as a sum of given values with respect to all the plurality of sub-areas.

8. The rain sensor according to claim 3, wherein
   in the given process,
   a given value is obtained by weighting a difference between the first variation degree and the second variation degree with respect to the each of the plurality of sub-areas, using a value defined to the each of the plurality of sub-areas, and
   the result of incorporating given values is obtained as a sum of given values with respect to all the plurality of sub-areas.

9. The rain sensor according to claim 3, wherein
   in the given process,
   when a first difference between the first variation degree and the second variation degree with respect to the each of the plurality of sub-areas is not larger than a threshold value that is unique to the each of the plurality of sub-areas, the first difference is assigned zero as a given value, when a second difference between the first variation degree, and the second variation degree with respect to the each of the plurality of sub-areas is larger than the threshold value that is unique to the each of the plurality of sub-areas, the second difference is further weighted using a value defined to the each of the plurality of sub-areas to obtain a given value, and the result of incorporating given values is obtained as a sum of given values with respect to all the plurality of sub-areas.

10. The rain sensor according to claim 1, wherein the variation degree includes at least one of a variance and a standard deviation with respect to intensities of pixels included in an image taken by the camera.

11. The rain sensor according to claim 1, wherein the processor detects that rain is present when the variation degree of the moment-to-moment transition of the intensities of the pixels in the image with the long focal length exceeds a threshold, and rain is not present when the variation degree of the moment-to-moment transition of the intensities of the pixels in the image with the long focal length does not exceed the threshold.

12. The rain sensor according to claim 11, wherein the moment-to-moment transition is determined from a current variance and a previous variance from the previous most recently obtained image.

* * * * *